US012677050B2

(12) United States Patent
Wöhlte

(10) Patent No.: US 12,677,050 B2
(45) Date of Patent: Jul. 7, 2026

(54) VEHICULAR CAMERA ASSEMBLY WITH LENS HEATER

(71) Applicant: Magna Electronics Inc., Auburn Hills, MI (US)

(72) Inventor: Wilhelm Johann Wolfgang Wöhlte, Sailauf (DE)

(73) Assignee: Magna Electronics Inc., Auburn Hills, MI (US)

( * ) Notice: Subject to any disclaimer, the term of this patent is extended or adjusted under 35 U.S.C. 154(b) by 64 days.

(21) Appl. No.: 18/769,505

(22) Filed: Jul. 11, 2024

(65) Prior Publication Data

US 2025/0024125 A1 Jan. 16, 2025

Related U.S. Application Data

(60) Provisional application No. 63/513,645, filed on Jul. 14, 2023.

(51) Int. Cl.
H04N 23/52 (2023.01)
H04N 23/51 (2023.01)

(52) U.S. Cl.
CPC ............. H04N 23/52 (2023.01); H04N 23/51 (2023.01)

(58) Field of Classification Search
CPC ........ H04N 23/52; H04N 23/51; H04N 23/55; H04N 23/57
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,796,094 A | 8/1998 | Schofield et al. |
| 5,949,331 A | 9/1999 | Schofield et al. |
| 7,965,336 B2 | 6/2011 | Bingle et al. |
| 8,542,451 B2 | 9/2013 | Lu et al. |
| 8,694,224 B2 | 4/2014 | Chundrlik, Jr. et al. |
| 8,994,878 B2 | 3/2015 | Byrne et al. |
| 9,036,026 B2 | 5/2015 | Dellantoni et al. |
| 9,077,098 B2 | 7/2015 | Latunski |
| 9,277,104 B2 | 3/2016 | Sesti et al. |
| 9,565,342 B2 | 2/2017 | Sauer et al. |
| 9,621,769 B2 | 4/2017 | Mai et al. |
| 9,878,669 B2 | 1/2018 | Kendall |
| 10,071,687 B2 | 9/2018 | Ihlenburg et al. |
| 10,142,532 B2 | 11/2018 | Mleczko |
| 10,230,875 B2 | 3/2019 | Mleczko et al. |

(Continued)

*Primary Examiner* — Nhan T Tran
(74) *Attorney, Agent, or Firm* — HONIGMAN LLP

(57) ABSTRACT

A vehicular camera assembly includes a lens barrel that accommodates a lens. An imager printed circuit board (imager PCB) has an imager aligned with the lens. First and second vias are formed through the imager PCB. First and second connecting pins are electrically connected to a heating device and are received at the first and second vias of the imager PCB. The imager PCB is movable along the first and second connecting pins at least in a direction parallel to a longitudinal axis of the lens barrel. The first and second connecting pins are fixed to the imager PCB at the first and second vias. The heating device is electrically connected to circuitry of the vehicular camera assembly via the first and second connecting pins and, when the heating device is operated via the circuitry of the vehicular camera assembly, the heating device heats the lens.

30 Claims, 6 Drawing Sheets

(56) References Cited

U.S. PATENT DOCUMENTS

| | | | |
|---|---|---|---|
| 10,250,004 | B2 | 4/2019 | Conger et al. |
| 10,272,857 | B2 | 4/2019 | Conger et al. |
| 10,466,563 | B2 | 11/2019 | Kendall et al. |
| 10,484,587 | B2 | 11/2019 | Conger |
| 10,761,319 | B2 * | 9/2020 | Kumar ................... H04N 23/55 |
| 10,894,275 | B2 | 1/2021 | Byrne et al. |
| 11,140,301 | B2 | 10/2021 | Condron et al. |
| 11,535,158 | B2 | 12/2022 | Liu et al. |
| 11,801,795 | B2 | 10/2023 | Sauer et al. |
| 2006/0171704 | A1 * | 8/2006 | Bingle ...................... B60R 1/04 |
| | | | 396/419 |
| 2014/0218535 | A1 | 8/2014 | Ihlenburg et al. |
| 2014/0373345 | A1 | 12/2014 | Steigerwald |
| 2015/0124098 | A1 | 5/2015 | Winden et al. |
| 2015/0222795 | A1 | 8/2015 | Sauer et al. |
| 2015/0327398 | A1 | 11/2015 | Achenbach et al. |
| 2016/0037028 | A1 | 2/2016 | Biemer |
| 2016/0243987 | A1 | 8/2016 | Kendall |
| 2016/0264064 | A1 | 9/2016 | Byrne et al. |
| 2016/0286103 | A1 | 9/2016 | Van Dan Elzen |
| 2017/0280034 | A1 | 9/2017 | Hess et al. |
| 2018/0098033 | A1 | 4/2018 | Mleczko et al. |
| 2018/0152609 | A1 | 5/2018 | Wang et al. |
| 2018/0170279 | A1 | 6/2018 | Achenbach et al. |
| 2019/0113743 | A1 | 4/2019 | Kumar |
| 2020/0292918 | A1 * | 9/2020 | Park ......................... H05B 3/84 |
| 2020/0314311 | A1 | 10/2020 | Liu et al. |
| 2020/0379206 | A1 * | 12/2020 | Rafalowski .............. H05B 3/84 |
| 2021/0382375 | A1 | 12/2021 | Sesti et al. |
| 2022/0053112 | A1 | 2/2022 | Lu |
| 2022/0089102 | A1 * | 3/2022 | Sauer .................... H04N 23/52 |
| 2022/0373762 | A1 | 11/2022 | Skrocki |

* cited by examiner

VEHICULAR CAMERA ASSEMBLY WITH LENS HEATER

CROSS REFERENCE TO RELATED APPLICATION

The present application claims the filing benefits of U.S. provisional application Ser. No. 63/513,645, filed Jul. 14, 2023, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A driving assistance system or vision system or imaging system for a vehicle utilizes one or more cameras (preferably one or more CMOS cameras) to capture image data representative of images exterior of the vehicle. The system may provide communication/data signals, including camera data or captured image data, for generating video images that may be displayed at a display screen that is viewable by the driver of the vehicle, such as when the driver is backing up the vehicle. The captured image data may be processed and, responsive to such image processing, the system may detect an object at or near the vehicle and in the path of travel of the vehicle, such as when the vehicle is backing up. The vision system may be operable to display a surround view or bird's eye view of the environment at or around or at least partially surrounding the subject or equipped vehicle, and the displayed image may include a displayed image representation of the subject vehicle.

A vehicular camera of the vision system may include a camera housing and a lens barrel that accommodates a lens having optic elements, with the lens barrel disposed at the camera housing. An imager printed circuit board (imager PCB) is disposed at the camera housing. The imager PCB has a front side and a rear side separated by a thickness dimension of the imager PCB, and an imager is disposed at the front side of the imager PCB and faces the lens accommodated by the lens barrel. A heating device is disposed at or in or on at least a portion of the lens barrel. The heating device is electrically connected to circuitry of the vehicular camera via a first connecting pin and a second connecting pin. The first connecting pin is electrically connected to the heating device and is fixed relative to the lens barrel, and a portion of the first connecting pin extends from the lens barrel along a longitudinal axis of the lens barrel toward the first side of the imager PCB. The second connecting pin is electrically connected to the heating device and is fixed relative to the lens barrel, and a portion of the second connecting pin extends from the lens barrel along the longitudinal axis of the lens barrel toward the first side of the imager PCB. The portion of the second connecting pin is spaced from the portion of the first connecting pin. The first connecting pin is received at a first via or passageway formed through the imager PCB, and the second connecting pin is received at a second via or passageway formed through the imager PCB. With the first connecting pin movably received at the first via and the second connecting pin movably received at the second via, the imager PCB is movable relative to the lens along the first connecting pin and the second connecting pin along the longitudinal axis of the lens barrel to focus the imager relative to the lens. With the imager focused relative to the lens, the first connecting pin is fixed to the imager PCB at the first via and the second connecting pin is fixed to the imager PCB at the second via. The camera housing includes a connector portion that is configured to electrically connect the vehicular camera to a wire harness connector of a vehicle when the vehicular camera is disposed at the vehicle to electrically connect the circuitry of the vehicular camera to a power source of the vehicle. With the vehicular camera disposed at the vehicle and with the vehicular camera electrically connected to the wire harness connector of the vehicle, the heating device, when electrically operated, heats at least part of the lens that is adjacent to the portion of the lens barrel.

These and other objects, advantages, purposes and features of the present invention will become apparent upon review of the following specification in conjunction with the drawings.

DESCRIPTION OF THE PREFERRED EMBODIMENTS

A vehicular vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a rearview display or a top down or bird's eye or surround view display or the like.

Figure 1:
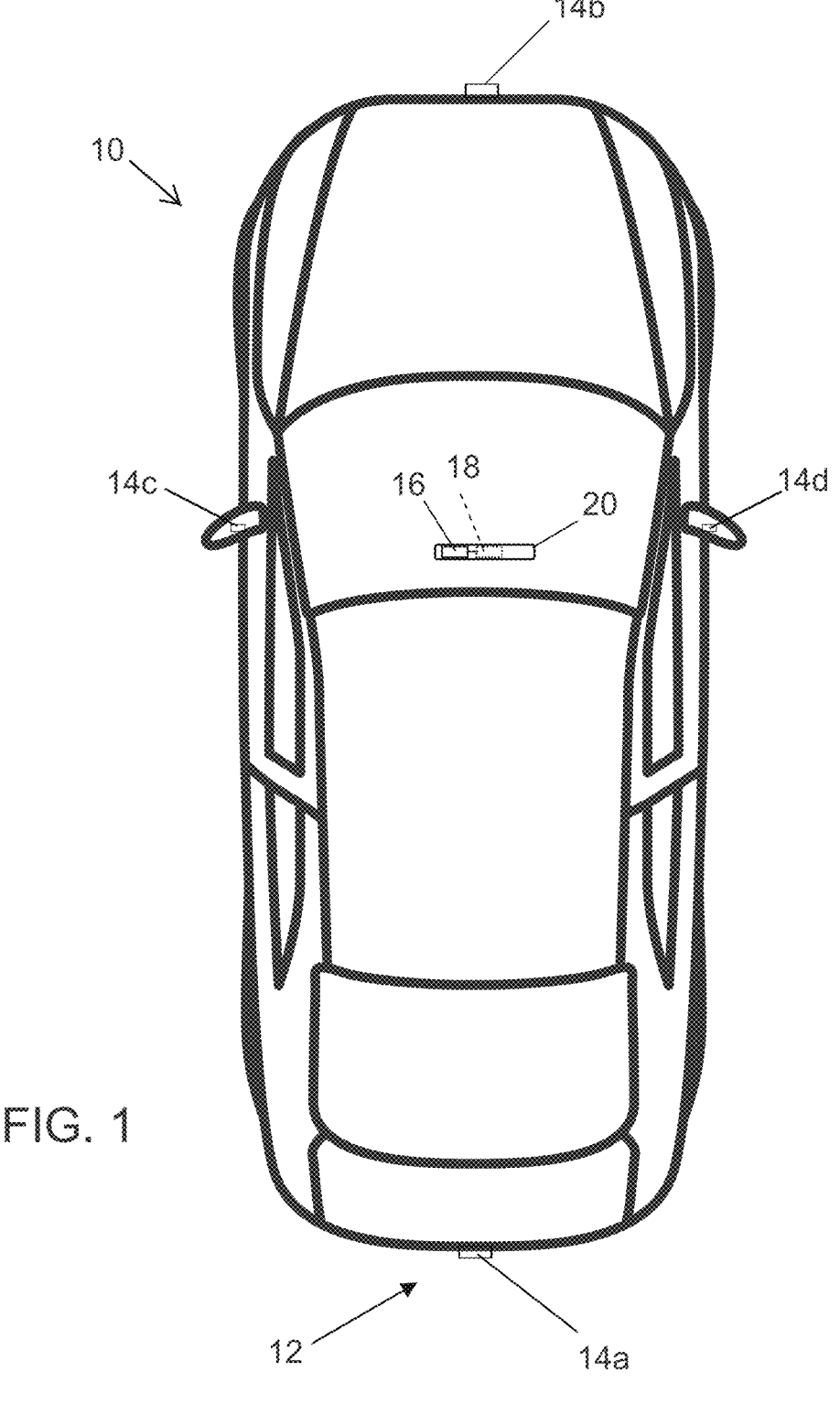
FIG. 1 is a plan view of a vehicle with a vehicular vision system that incorporates cameras.
Figure 2:
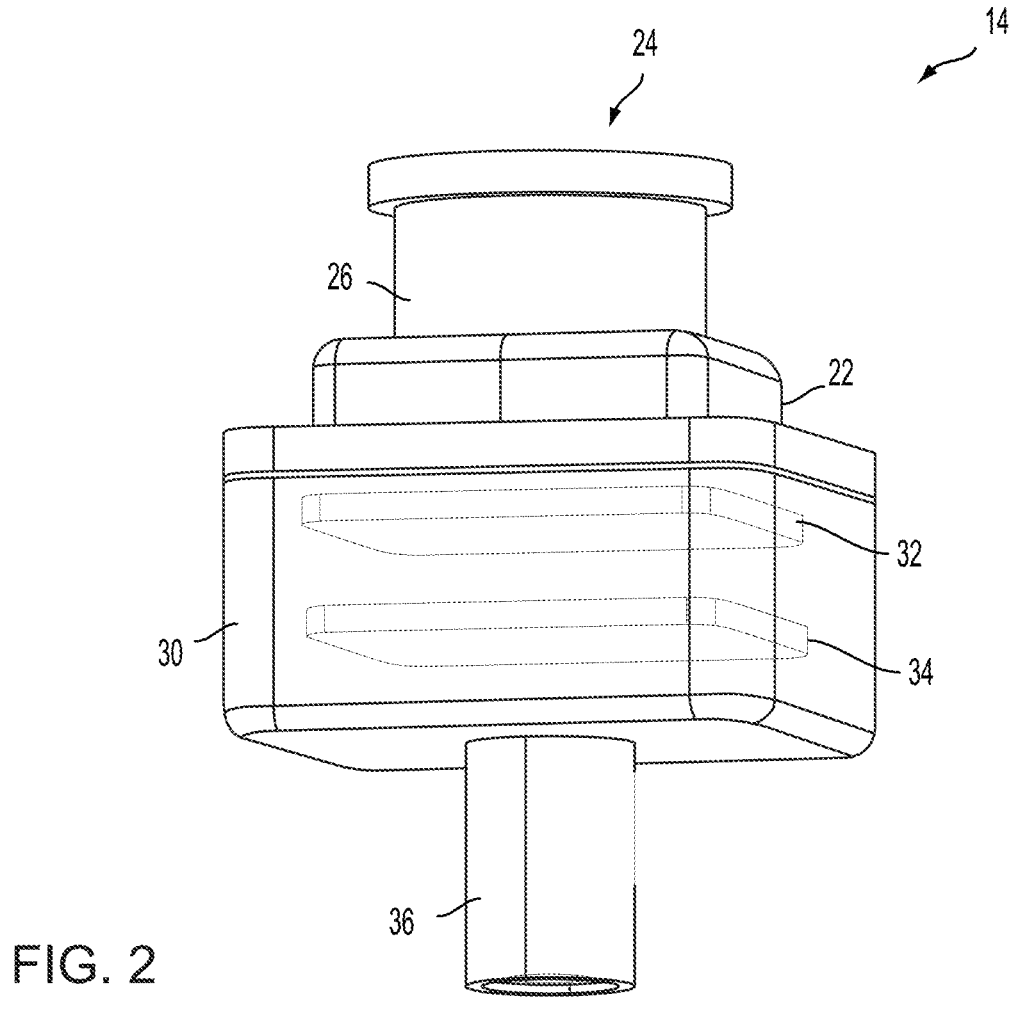
FIG. 2 is a perspective view of a camera of the vehicular vision system.
Figure 3:
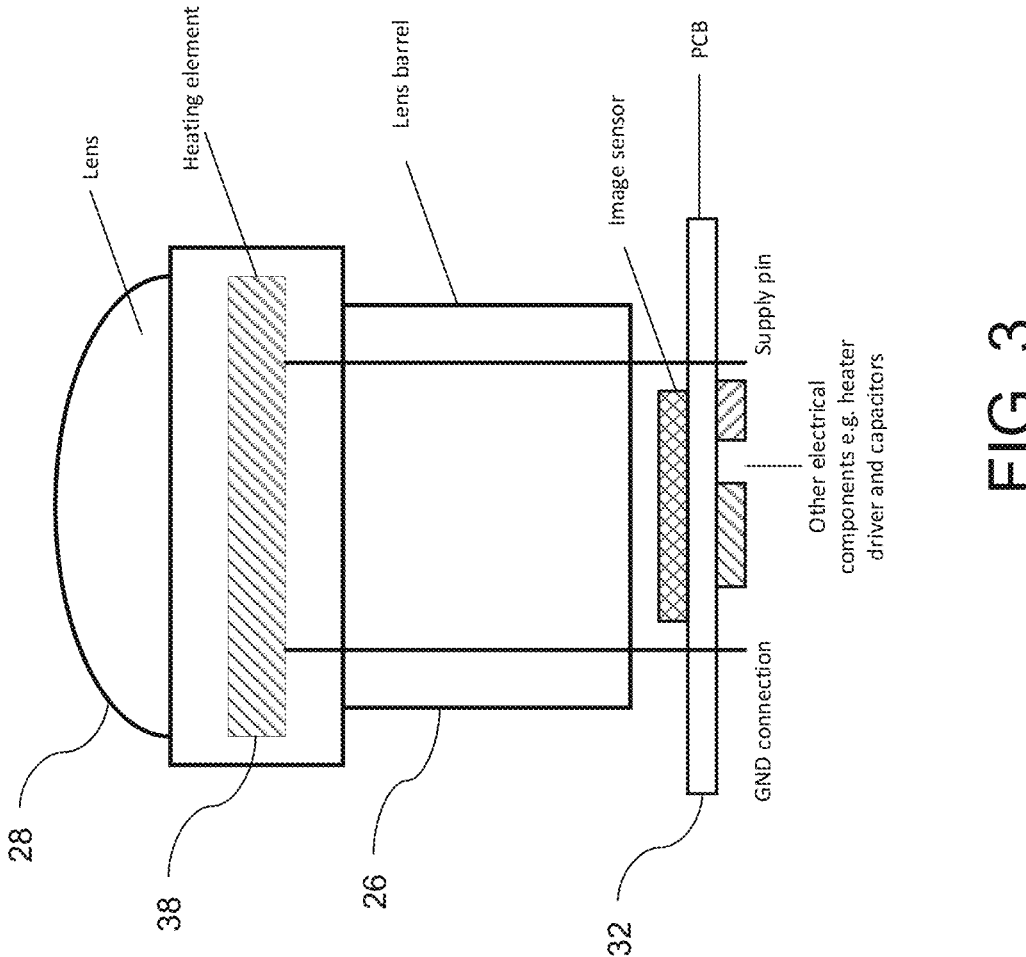
FIG. 3 is a sectional view of the camera.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14*a* (and the system may optionally include multiple exterior viewing imaging sensors or cameras, such as a forward viewing camera 14*b* at the front (or at the windshield) of the vehicle, and a sideward/rearward viewing camera 14*c*, 14*d* at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Each exterior viewing camera 14 includes a housing and an imager and a lens that is oriented such that the camera 14 views exterior of the vehicle. Because at least an outer lens element of the camera is exposed at the vehicle exterior, the camera may be exposed to cold temperatures and temperature and humidity fluctuations, whereby moisture and/or ice or snow may form or collect at the lens. Further, the lens may be susceptible to dirt or debris collecting at the lens of the camera 14. This is particularly an issue for cameras mounted at the front of the vehicle, such as at a front bumper or grill or front fascia of the vehicle, or at the rear of the vehicle.

Referring to FIGS. 2-6, the camera 14 includes a lens holder or front housing portion 22, which supports or accommodates a lens assembly 24. The lens assembly 24 includes a lens barrel 26 (such as a cylindrical lens barrel) that houses or accommodates a lens 28 having a plurality of lens optics or lens elements. The lens barrel 26 may comprise a metal lens barrel (or may comprise any suitable material, such as a plastic or polymeric or thermoplastic material or the like). Optionally, the lens barrel 26 is integrally formed with the lens holder 22. The camera 14 includes a rear housing portion 30 that is mated with the lens holder or front housing portion 22 to encase an imager printed circuit board (imager PCB) 32 (having the imager disposed thereat and aligned with the lens) and a connector printed circuit board (connector PCB) 34 therein. Optionally, the camera 14 includes a single PCB accommodating the imager and imaging circuitry and connector circuitry. The rear housing portion 30 includes a connector portion 36 (such as a coaxial connector) for electrically connecting the camera 14 to a wire harness or coaxial connector of the vehicle. The camera 14 includes a heating device 38 disposed at the lens barrel 26 and at least partially circumscribing the lens barrel.

The heating device 38 disposed at the lens barrel 26 may comprise any suitable heating device oriented within, integrated with, or at least partially circumscribing the lens barrel 26 and/or lens element 28. For example, the heating device 38 may be disposed at an inner portion of the lens barrel 26, such that the heating device 38 circumscribes an inner circumference or inner surface of the lens barrel 26 or the heating device 38 may be disposed at the lens 28 accommodated by the lens barrel 26, or the heating device 38 may be disposed within a wall or integrated into the lens barrel 26. When the heating device 38 is electrically operated, the heating device 38 generates heat at the lens barrel 26 and/or one or more of the optic elements to defrost or defog or reduce or remove condensation from the lens element.

Figure 4:
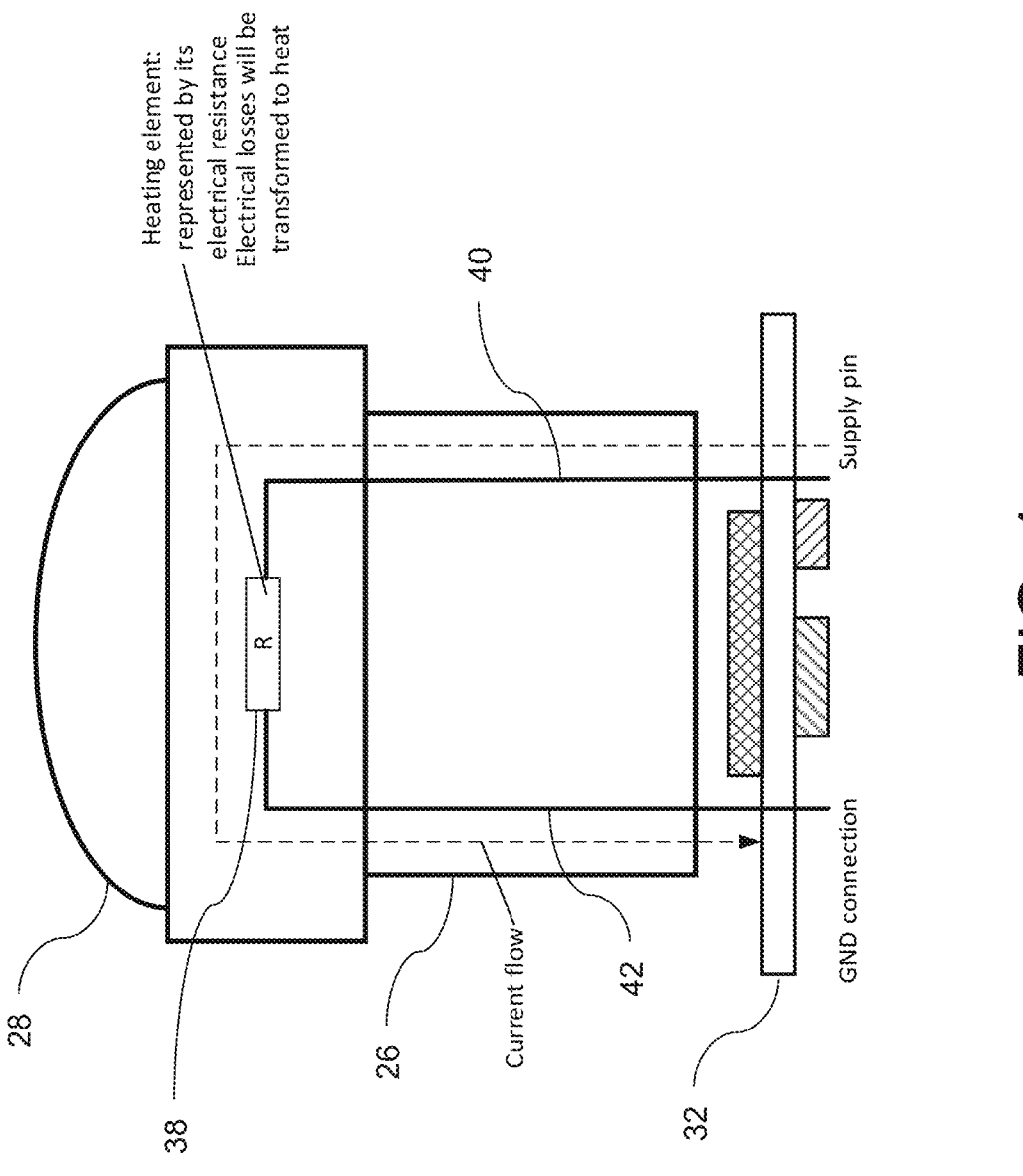
FIG. 4 is another sectional view of the camera, showing a flow of electrical current from the PCB along a first connecting pin to a heating element of the camera and back along a second connecting pin to ground.

As shown in FIG. 4, the heating device 38 may comprise a resistance heating element (or resistive heating coating applied at one or more of the optic elements of the lens), where electric current passing through or across the heating device 38 encounters resistance, resulting in heating of the element 38. A first electrical connector pin or supply terminal 40 electrically connects between a heating circuit on the PCB (such as on the imager PCB or the connector PCB) and the heating device 38 to supply electrical current to the heating device 38 and a second electrical connector pin or terminal 42 electrically connects the heating device 38 back to ground. Thus, electrical current from the heating circuit is provided to the heating device 38 via the first pin 40 to heat the heating device 38 and the second pin 42 connects the heating device 38 to ground.

In other words, the heating device 38 may be represented by its electrical resistance as electrical losses across the heating device 38 may be transformed to heat. When the heating device is electrically operated to heat the lens and/or lens barrel, a heater driver circuit on the PCB supplies power to the heating device 38 embedded in the lens barrel 26 or lens 28. Current flows from the source, over or through the heating device and back to ground. The resistance of the heating device 38 transforms electrical current into thermal energy and the lens is heated.

The first pin 40 and the second pin 42 may comprise rigid or stiff metallic pins that extend between the heating device 38 (which may be at an outer most lens element or at an outer end of the lens barrel that is distal from the imager PCB) and the PCB 32. The first pin 40 and the second pin 42 may extend along the inner surface of the lens barrel 26. Optionally, the first pin 40 and the second pin 42 are at least partially embedded in or integrated with the lens barrel 26. For example, the first pin 40 and the second pin 42 may primarily extend along and within a wall of the lens barrel 26 so as to not be exposed exterior the lens barrel 26 or interior the lens barrel 26. Respective first ends of the pins electrically connect to the heating device 38, such as by extending from the inner surface of the lens barrel to electrically connect to the heating device. A second end of the first pin 40 (the end opposite the first end) electrically connects to the power source via electrical connection at the imager PCB 32, such as by extending from the inner surface of the lens barrel (or an end surface of the lens barrel facing the PCB) to electrically connect to the imager PCB 32. A second end of the second pin 42 (the end opposite the first end) electrically connects to ground, such as by extending from the inner surface of the lens barrel (or the end surface of the lens barrel facing the PCB) to electrically connect to the imager PCB 32.

Figures 5, 5A:
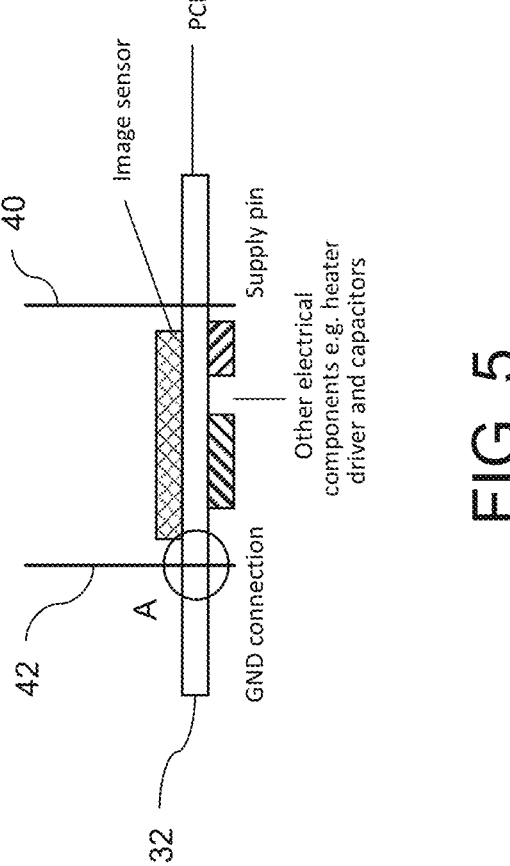
FIG. 5 is a sectional view of the PCB, the first connecting pin and the second connecting pin of the camera.
FIG. 5A is an enlarged view of area A in FIG. 5.

As shown in FIGS. 5 and 5A, through holes or passageways or vias 44 may be formed through the PCB 32 and configured to respectively receive the first pin 40 and the second pin 42. For example, the passageways 44 may include channels or through holes formed through the PCB 32 or notches or recessed portions along a peripheral edge region of the PCB 32. As discussed further below, the first pin 40 and the second pin 42 may be movably received within or at respective vias 44 during assembly of the camera 14 and then electrically connected to the power source and ground. The pins are movable relative to the PCB 32 to accommodate movement of the PCB 32 during alignment of the lens and imager. With the lens and imager aligned and focused, and with the respective pins positioned at the respective vias 44, the pins 40 may be electrically connected and fixed relative to the PCB 32 and the ground, such as via partial soldering, laser soldering, wave soldering and the like. That is, simple through holes or vias can be used for realizing the connection between the heater and the PCB. A partial soldering technique, such as laser soldering, wave soldering and the like can be used to realize the solder joints.

Figure 6:
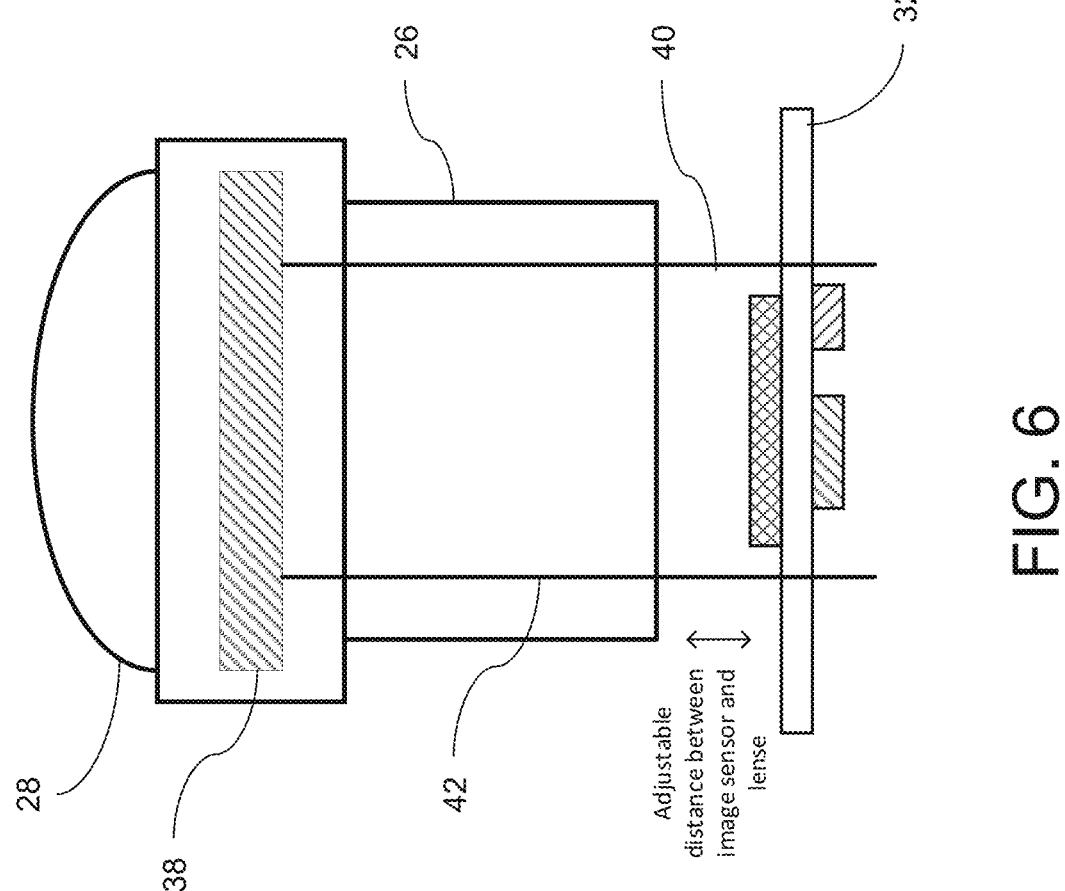
FIG. 6 is another sectional view of the camera, showing adjustment of the PCB along the first connecting pin and the second connecting pin during focus of the imager relative to the lens.

Referring to FIG. 6, because the first pin 40 and the second pin 42 may be embedded in or fixed relative to the lens holder 22 and/or lens barrel 26, when the pins are movably received in the respective vias 44, the pins may act as a guide for movement of the imager PCB 32 relative to the lens 28 during focus and alignment of the lens 28 and imager. That is, during focus and alignment of the lens 28 and imager, the imager PCB 32 may be moved along the pins closer to and further from the lens 28 (e.g., along a longitudinal axis of the lens barrel), with the pins at least partially limiting movement of the imager PCB 32 away from the longitudinal axis of the lens barrel 26 (i.e., in directions transverse to the longitudinal axis of the lens barrel). That is, the pins moving within the vias 44 act as a guide to maintain lateral position or limit lateral movement of the imager relative to the lens 28 while allowing for longitudinal movement of the imager relative to the lens 28. With the lens 28 and imager aligned, the first pin 40 and the second pin 42 may be at least partially fixed relative to the PCB 32 and the PCB 32 may be at least partially fixed relative to the lens 28 and lens holder 22.

In other words, as the pins of the heating element 38 may be embedded in the lens holder and are quite stiff, the pins can be used for alignment and guiding the PCB 32. For example, the distance between the image sensor and the lens 28 may be controlled more easily, allowing for easier focusing of the camera 14. A grasper, such as a suction grasper or nozzle or similar device, may be used to adjust the distance between the image sensor and the lens 28 (such as via controlling the position of the PCB 32 along the pins) and the solder process may begin when the desired focus distance between the imager and the lens 28 is established. For example, laser soldering may create a solder joint between the PCB and the respective pins and will hold the PCB 32 and the lens 28 in place relative to one another.

Thus, during assembly of the camera 14, the imager may be disposed at the imager PCB 32 (and optionally, other electrical components, such as the heating control circuit, may be disposed at the first or second side of the imager PCB). The lens assembly 24 is disposed at the lens holder 22. Optionally, the lens assembly 24 is integrally formed with the lens holder 22. The imager PCB 32 is aligned with the first pin 40 and the second pin 42 of the heating device 38 and moved along the respective pins to adjust the distance between the imager and the lens 28 to focus the imager. With the lens 28 and imager focused and aligned, the first pin 40 and the second pin 42 are soldered to the PCB at the respective vias 44, and the rear housing 30 may be joined to the front housing 22.

Optionally, the heating control circuit may be disposed at the connector PCB 34, such that the first pin 40 and the second pin 42 extend through or around or past the imager PCB 32 and are at least partially received at respective vias formed in the connector PCB 34. Thus, the imager PCB 32 may be moved along the pins to focus the imager, and soldered to the pins to fix a position of the PCB 32 relative to the lens 28, with electrical connection between the power source and the heating element 28 and ground provided at the connector PCB 34.

With the camera 14 installed at the vehicle 10, the system energizes the heating element 38 via the heating circuit at the PCB 32 to heat the lens 28 and/or lens barrel 26 and remove ice, snow, condensation and the like from the lens 28. For example, the vision system may determine that image data captured by the camera 14 is at least partially occluded or obstructed or corrupted by moisture at the lens 28 and, in response to determining presence of moisture at the lens 28, the system electrically operates the heating device 38 to heat the lens 28 and remove the moisture. Optionally, the heating device 38 may be operated to heat the lens 28 based on an environmental temperature at the vehicle being below a threshold temperature (such as below 40 degrees Fahrenheit, below 32 degrees Fahrenheit, below 20 degrees Fahrenheit, below 0 degrees Fahrenheit and the like). Optionally, control circuitry may be disposed at the camera 14, such as at the imager PCB 32 or connector PCB 34, for controlling operation of the heating device 38.

Thus, the camera 14 provides and automotive or vehicular camera including lens heater functionality. The camera combines camera features, such as providing an image directly to the display device or to another ECU, and includes elements to defrost its lens on its own. The camera is assembled as a single-box or single module or unit (comprising the lens, the PCB or PCBs, associated circuits and circuitry, the imager, optional vehicle interface or connector, optional high-speed interface, etc.) using standard assembly processes, such as soldering. For example, distance between the image sensor and the lens can be used for focus and alignment and other calibration activities, and when target values are achieved, the solder process will start to fix the distance between the lens and the imager.

The camera includes a lens for catching the light/information and that includes the heating element. Further, the camera includes one or more PCBs and supporting circuits, such as power supply circuits, and the image sensor. Optionally, the camera includes a vehicle interface, such as a Controller Area Network Flexible Data Rate (CAN-FD) or Ethernet port for providing point cloud or similar information. The camera includes a high-speed data interface for streaming out the video data generated from the captured image data. Data captured by the image sensor may be streamed out to another device, such as the display device at the interior cabin of the vehicle.

The camera may operate without any driver input or interaction and can be installed at multiple positions about the vehicle, such as at the exterior rearview mirrors, at an outer surface of the vehicle trunk or liftgate or tailgate, and the like. Based on processing, such as at a processor within the camera or at an external vehicle ECU, the system detects that the lens is covered by ice. Optionally, sensor data representative of the temperature exterior of the vehicle can be read out over the vehicle BUS. Lenses covered with ice or snow prevent proper function of vehicular cameras as no valid image is available. The heating element, which may be embedded in the lens barrel of the camera, is used to defrost the lens when needed.

Traditionally, cameras with integrated heater structures may use cables and/or connectors to connect the driving circuit with the heater element. This results in a higher bill of materials cost and increases the manufacturing complexity of the camera, which may reduce the robustness of the camera. The heating element 38 of the camera 14 is connected by two pins to the PCB and the electrical circuit on the camera PCB drives the heating element. Thus, the driver does not need to remove ice by hand, which can cause scratches on the camera lens. Further, the camera detects when heating is required on its own and the pins may aid during in component positioning during assembly of the camera 14, such as during focus and alignment of the imager and lens.

The camera may optionally also include a fluid spraying device that connects to a pressurized fluid supply and has a fluid passageway and nozzle so as to spray fluid onto the lens to clean the lens of dirt or debris. The spraying or cleaning device may operate with or separate from the heating device.

Thus, the camera includes a heating system (and optionally a washer system) that can be disposed at a vehicular camera (such as at and at least partially or entirely around or within a lens barrel of the camera) for heating the lens. The heating device, pins and camera may utilize aspects of cameras and electrical connectors described in U.S. Pat. Nos. 10,484,587; 10,466,563; 9,878,669 and/or 9,565,342, which are hereby incorporated herein by reference in their entireties. The vehicular camera may utilize aspects of the cameras described in U.S. Publication Nos. US-2022-0089102; US-2022-0053112; US-2019-0113743; US-2018-0207691; US-2016-0272163 and/or US-2016-0264064, which are hereby incorporated herein by reference in their entireties.

Active focus and alignment may be used to set and secure a focal position of the lens relative to the imager component. For example, the imager PCB may be secured relative to the lens holder or front camera housing and the lens barrel may be attached (such as via threaded attachment) at the lens holder to set focus and alignment of the imager relative to the lens. The lens or lens barrel may be actively moved to set focus and alignment and an adhesive, such as an ultraviolet (UV) curable quick cure adhesive, may be used to secure the lens relative to the lens holder and the imager. Optionally, the camera may include a one piece lens assembly secured to the front camera housing and the imager PCB may be actively moved relative to the lens and front camera housing to set the focus, alignment and rotation of the imager relative to the lens. For example, alignment of the imager and lens may include characteristics of the processes and camera described in U.S. Publication Nos. US-2022-0373762 and/or US 2021-0382375, which are hereby incorporated herein by reference in their entireties.

The camera assembly or module may utilize aspects of the cameras and connectors described in U.S. Pat. Nos. 10,272,857; 10,250,004; 10,230,875; 10,142,532; 9,621,769; 9,277,104; 9,077,098; 8,994,878; 8,542,451 and/or 7,965,336, and/or U.S. Publication Nos. US-2009-0244361; US-2013-0242099; US-2014-0373345; US-2015-0124098; US-2015-0222795; US-2015-0327398; US-2016-0243987; US-2016-0268716; US-2016-0286103; US-2016-0037028; US-2017-0129419; US-2017-0133811; US-2017-0201661; US-2017-0280034; US-2017-0295306 and/or US-2018-0098033, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera assembly, the vehicular camera assembly comprising:
a lens barrel that accommodates a lens comprising a plurality of optical elements;
an imager printed circuit board (imager PCB), wherein the imager PCB has a first side and a second side separated by a thickness dimension of the imager PCB;
wherein an imager is disposed at the first side of the imager PCB, and wherein the imager is aligned with the lens accommodated by the lens barrel;
a connector printed circuit board (connector PCB), wherein the imager PCB is disposed between the connector PCB and the lens accommodated by the lens barrel;
wherein (i) a first via is formed through the imager PCB and (ii) a second via is formed through the imager PCB and spaced from the first via;
a heating device;
a first connecting pin having (i) a first end electrically connected to the heating device, (ii) a second end secured to the connector PCB and (iii) a portion between the first end of the first connecting pin and the second end of the first connecting pin that is received at the first via of the imager PCB;
a second connecting pin having (i) a first end electrically connected to the heating device, (ii) a second end secured to the connector PCB and (iii) a portion between the first end of the second connecting pin and the second end of the second connecting pin that is received at the second via of the imager PCB;
wherein, with the portion of the first connecting pin received at the first via and the portion of the second connecting pin received at the second via, and during focus of the imager and the lens accommodated by the lens barrel, the imager PCB is movable relative to the lens along the portion of the first connecting pin and the portion of the second connecting pin at least in a direction parallel to a longitudinal axis of the lens barrel;
wherein, with the imager and the lens focused, the first connecting pin is secured to the imager PCB at the first via and the second connecting pin is secured to the imager PCB at the second via;
wherein the heating device is electrically connected to circuitry of the vehicular camera assembly via the first connecting pin and the second connecting pin; and
wherein, when the heating device is electrically operated via the circuitry of the vehicular camera assembly, the heating device heats the lens accommodated by the lens barrel.

2. The vehicular camera assembly of claim 1, wherein the circuitry is disposed at the second side of the imager PCB.

3. The vehicular camera assembly of claim 1, wherein at least the portion of the first connecting pin and at least the portion of the second connecting pin extend parallel to the longitudinal axis of the lens barrel.

4. The vehicular camera assembly of claim 1, wherein the first connecting pin and the second connecting pin extend from the lens barrel toward the first side of the imager PCB.

5. The vehicular camera assembly of claim 1, wherein the first connecting pin and the second connecting pin are at least partially embedded within a cylindrical wall of the lens barrel.

6. The vehicular camera assembly of claim 1, wherein movement of the imager PCB in directions transverse to the longitudinal axis of the lens barrel is limited by the first connecting pin at the first via and the second connecting pin at the second via.

7. The vehicular camera assembly of claim 1, comprising a camera housing, wherein the lens barrel is disposed at the camera housing, and wherein the camera housing accommodates the imager PCB.

8. The vehicular camera assembly of claim 7, wherein the camera housing includes a connecting portion that is configured to electrically connect the vehicular camera assembly to a wire harness connector of a vehicle when the vehicular camera assembly is disposed at the vehicle.

9. The vehicular camera assembly of claim 8, wherein, with the vehicular camera assembly disposed at the vehicle, the first connecting pin is electrically connected to a power source of the vehicle and the second connecting pin is electrically connected to a grounding element.

10. The vehicular camera assembly of claim 8, wherein the vehicular camera assembly is configured to be disposed at an exterior portion of the vehicle so as to have a field of view exterior of the vehicle.

11. The vehicular camera assembly of claim 1, wherein the first connecting pin and the second connecting pin comprise rigid electrical connectors.

12. The vehicular camera assembly of claim 1, wherein, with the imager and the lens focused, the first connecting pin is secured to the imager PCB at the first via using laser welding and the second connecting pin is secured to the imager PCB at the second via using laser welding.

13. The vehicular camera assembly of claim 1, further comprising an electronic control unit (ECU) comprising electronic circuitry and associated software, wherein the ECU controls operation of the heating device responsive at least in part to a determined temperature at the lens.

14. The vehicular camera assembly of claim 13, wherein circuitry of the imager PCB includes the ECU.

15. The vehicular camera assembly of claim 1, wherein the heating device comprises an electrically resistive heating element that at least partially circumscribes at least one optical element of the plurality of optical elements of the lens.

16. The vehicular camera assembly of claim 15, wherein the at least one optical element comprises an outermost optical element of the plurality of optical elements of the lens.

17. The vehicular camera assembly of claim 1, wherein the heating device comprises an electrically resistive coating that is applied to a surface of at least one optical element of the plurality of optical elements of the lens.

18. The vehicular camera assembly of claim 17, wherein the at least one optical element comprises an outermost optical element of the plurality of optical elements of the lens.

19. The vehicular camera assembly of claim 1, wherein the heating device is disposed at the lens barrel.

20. A vehicular camera assembly, the vehicular camera assembly comprising:
a camera housing;
a lens barrel disposed at the camera housing, wherein the lens barrel accommodates a lens comprising a plurality of optical elements;
an imager printed circuit board (imager PCB) accommodated by the camera housing, wherein the imager PCB has a first side and a second side separated by a thickness dimension of the imager PCB;

wherein an imager is disposed at the first side of the imager PCB, and wherein the imager is aligned with the lens accommodated by the lens barrel;

a connector printed circuit board (connector PCB), wherein the imager PCB is disposed between the connector PCB and the lens accommodated by the lens barrel;

wherein (i) a first via is formed through the imager PCB and (ii) a second via is formed through the imager PCB and spaced from the first via;

a heating device disposed at the lens barrel;

a first connecting pin having (i) a first end electrically connected to the heating device, (ii) a second end secured to the connector PCB and (iii) a portion between the first end of the first connecting pin and the second end of the first connecting pin that is received at the first via of the imager PCB;

a second connecting pin having (i) a first end electrically connected to the heating device, (ii) a second end secured to the connector PCB and (iii) a portion between the first end of the second connecting pin and the second end of the second connecting pin that is received at the second via of the imager PCB;

wherein, with the portion of the first connecting pin received at the first via and the portion of the second connecting pin received at the second via, and during focus of the imager and the lens accommodated by the lens barrel, the imager PCB is movable relative to the lens along the portion of the first connecting pin and the portion of the second connecting pin at least in a direction parallel to a longitudinal axis of the lens barrel, and wherein movement of the imager PCB in directions transverse to the longitudinal axis of the lens barrel is limited by the first connecting pin at the first via and the second connecting pin at the second via;

wherein, with the imager and the lens focused, the first connecting pin is secured to the imager PCB at the first via and the second connecting pin is secured to the imager PCB at the second via;

wherein the heating device is electrically connected to circuitry of the vehicular camera assembly via the first connecting pin and the second connecting pin; and wherein, when the heating device is electrically operated via the circuitry of the vehicular camera assembly, the heating device heats the lens accommodated by the lens barrel.

21. The vehicular camera assembly of claim 20, wherein the first connecting pin and the second connecting pin comprise rigid electrical connectors.

22. The vehicular camera assembly of claim 20, wherein the heating device comprises an electrically resistive heating element that at least partially circumscribes at least one optical element of the plurality of optical elements of the lens.

23. The vehicular camera assembly of claim 22, wherein the at least one optical element comprises an outermost optical element of the plurality of optical elements of the lens.

24. The vehicular camera assembly of claim 20, wherein the heating device comprises an electrically resistive coating that is applied to a surface of at least one optical element of the plurality of optical elements of the lens.

25. The vehicular camera assembly of claim 24, wherein the at least one optical element comprises an outermost optical element of the plurality of optical elements of the lens.

26. A vehicular camera assembly, the vehicular camera assembly comprising:

a lens barrel that accommodates a lens comprising a plurality of optical elements;

an imager printed circuit board (imager PCB), wherein the imager PCB has a first side and a second side separated by a thickness dimension of the imager PCB;

wherein an imager is disposed at the first side of the imager PCB, and wherein the imager is aligned with the lens accommodated by the lens barrel;

a connector printed circuit board (connector PCB), wherein the imager PCB is disposed between the connector PCB and the lens accommodated by the lens barrel;

wherein (i) a first via is formed through the imager PCB and (ii) a second via is formed through the imager PCB and spaced from the first via;

a heating device disposed at the lens barrel;

a first connecting pin having (i) a first end electrically connected to the heating device, (ii) a second end secured to the connector PCB and (iii) a portion between the first end of the first connecting pin and the second end of the first connecting pin that is received at the first via of the imager PCB;

a second connecting pin having (i) a first end electrically connected to the heating device, (ii) a second end secured to the connector PCB and (iii) a portion between the first end of the second connecting pin and the second end of the second connecting pin that is received at the second via of the imager PCB;

wherein the first connecting pin and the second connecting pin are partially embedded within a cylindrical wall of the lens barrel, and wherein the first connecting pin and the second connecting pin extend from the lens barrel toward the first side of the imager PCB, and wherein at least the portion of the first connecting pin and at least the portion of the second connecting pin extend parallel to a longitudinal axis of the lens barrel;

wherein, with the portion of the first connecting pin received at the first via and the portion second end of the second connecting pin received at the second via, and during focus of the imager and the lens accommodated by the lens barrel, the imager PCB is movable relative to the lens along the portion of the first connecting pin and the portion of the second connecting pin at least in a direction parallel to the longitudinal axis of the lens barrel;

wherein, with the imager and the lens focused, the first connecting pin is secured to the imager PCB at the first via and the second connecting pin is secured to the imager PCB at the second via;

wherein the heating device is electrically connected to circuitry of the vehicular camera assembly via the first connecting pin and the second connecting pin; and wherein, when the heating device is electrically operated via the circuitry of the vehicular camera assembly, the heating device heats the lens accommodated by the lens barrel.

27. The vehicular camera assembly of claim 26, wherein the circuitry is disposed at the second side of the imager PCB.

28. The vehicular camera assembly of claim 26, wherein, with the imager and the lens focused, the first connecting pin is secured to the imager PCB at the first via using laser welding and the second connecting pin is secured to the imager PCB at the second via using laser welding.

29. The vehicular camera assembly of claim 26, wherein the heating device comprises an electrically resistive heating element that at least partially circumscribes at least one optical element of the plurality of optical elements of the lens.

30. The vehicular camera assembly of claim 26, wherein the heating device comprises an electrically resistive coating that is applied to a surface of at least one optical element of the plurality of optical elements of the lens.

* * * * *